(12) United States Patent
Gorgichuk

(10) Patent No.: US 11,297,787 B2
(45) Date of Patent: Apr. 12, 2022

(54) HYDROPONIC PLANT CONTAINER WITH OFFSET OPENING PROVIDING ACCESS TO INTERIOR VOLUME, AND METHOD OF USING THE SAME

(71) Applicants: Huntley Ventures Inc., West Kelowna (CA); 2251600 Alberta Ltd., Lethbridge (CA)

(72) Inventor: Mitchell Dwayne Gorgichuk, Taber (CA)

(73) Assignees: HUNTLEY VENTURES INC., West Kelowna (CA); 2251600 ALBERTA LTD., Lethbridge (CA)

(*) Notice: Subject to any disclaimer, the term of this patent is extended or adjusted under 35 U.S.C. 154(b) by 136 days.

(21) Appl. No.: 16/362,641

(22) Filed: Mar. 23, 2019

(65) Prior Publication Data

US 2020/0296907 A1 Sep. 24, 2020

(51) Int. Cl.
*A01G 31/02* (2006.01)
*A01G 9/04* (2006.01)
*A01G 9/02* (2018.01)

(52) U.S. Cl.
CPC .............. *A01G 31/02* (2013.01); *A01G 9/021* (2013.01); *A01G 9/042* (2013.01)

(58) Field of Classification Search
CPC .......... A01G 9/02; A01G 9/021; A01G 9/042; A01G 9/045; A01G 9/022; A01G 9/023; A01G 27/00; A01G 27/02; A01G 31/02

(Continued)

(56) References Cited

U.S. PATENT DOCUMENTS 4,779,378 A * 10/1988 Mason, Jr. ............. A01G 9/023
47/83
5,241,784 A 9/1993 Henry
(Continued)

FOREIGN PATENT DOCUMENTS

GB 2230413 A * 10/1990 ............. A47D 11/00
WO 2013019105 2/2013
WO 2015183094 12/2015

OTHER PUBLICATIONS

Soothing Leaf, Easy DIY Beginner Hydroponic Kratky System, Feb. 26, 2017 https://www.youtube.com/watch?v=ODmJYML7ZRc (Year: 2017).*

(Continued)

*Primary Examiner* — Brady W Frazier
(74) *Attorney, Agent, or Firm* — Heslin Rothenberg Farley & Mesiti PC; Kristian E. Ziegler, Esq.

(57) ABSTRACT

A hydroponic plant container configured to facilitate the hydroponic growing of a plant wherein the container is configured to provide access to the root ball and other elements disposed therein without engaging the plant. The hydroponic plant container includes a body having a first portion and a second portion. The first portion and the second portion are defined by the same walls and bottom wherein the second portion is offset to the first portion. The first portion and the second portion have an interior volume that is fluidly coupled wherein the interior volume of the second portion is configured to provide a user access to the interior volume of the first portion. The first portion is provided in a preferred shape of round or square. The first portion further includes opposing lip members that are formed on the upper perimeter edge thereof.

20 Claims, 3 Drawing Sheets

(58) Field of Classification Search
USPC .......................................................... 47/62 R
See application file for complete search history.

(56) References Cited

U.S. PATENT DOCUMENTS

| | | | | |
|---|---|---|---|---|
| 5,289,953 A | * | 3/1994 | McMillan, III | A47G 19/12 |
| | | | | 222/189.07 |
| 5,533,302 A | * | 7/1996 | Lynch | A01G 9/023 |
| | | | | 47/66.5 |
| 2013/0333287 A1 | * | 12/2013 | Kassouni | A01G 9/023 |
| | | | | 47/83 |
| 2016/0174470 A1 | | 6/2016 | Schaffer | |
| 2019/0297786 A1 | * | 10/2019 | Rash | A01G 27/008 |

OTHER PUBLICATIONS

Extended European Search Report for European Patent Application No. 20164962.1, dated Sep. 30, 2020, 7 pages.

* cited by examiner

HYDROPONIC PLANT CONTAINER WITH OFFSET OPENING PROVIDING ACCESS TO INTERIOR VOLUME, AND METHOD OF USING THE SAME

FIELD OF THE INVENTION

The present invention relates generally to growing systems, more specifically but not by way of limitation, a hydroponic grow system specifically a container therefore that facilitates improved parameters such as but not limited to plant yields, increased plant size and accessory access.

BACKGROUND

As is known in the art, hydroponics is the practice of growing plants in a fluid such as but not limited to water instead of soil. When compared to traditional soil-grown crop production, hydroponics has the following advantages: One advantage is that hydroponics is up to ninety percent more efficient in the use of water. Another advantage is that plant production increases three to ten times in the same amount of space. Still a further advantage is that many crops can be produced twice as fast in a well managed hydroponic system. An additional advantage is decreasing the time between harvest and consumption which increases the nutritional value of the end product. Yet a further advantage to hydroponic growing is that indoor farming in a climate controlled environment means farms can exist in places where weather and soil conditions are not favorable for traditional plant production. Lastly, another advantage is that no chemical weed or pest control products are needed when operating a hydroponic system.

Growers can have total control over a hydroponic system. Growers are able to manage pH and nutrients to make sure plants are getting the exact nutrients they need. Hydroponic systems are closed and recycle the water that is not used by plants. The ability to grow indoors allows farmers to control temperatures and lighting schedules to improve plant production. Hydroponic systems can be designed to make use of vertical space and increase planting density. Hydroponics also allow us to create farms in locations where soil conditions are too poor to support farming, or space is limited and a farm otherwise couldn't exist. One drawback of existing hydroponic technology is the actual vessel or container. The container design is nothing more than a conventional five gallon bucket or similar shaped container wherein the plant is disposed therein in a basket. Air stones and other accessories are deployed and are often located underneath the plant basket. Once a plant has begun growing, it is ideal if the plant is not disturbed. Too often the plant must be lifted out of the hydroponic container thus creating a negative impact on the plant and its potential yield.

Accordingly, there is a need for a hydroponic container configured to receive a plant disposed in a basket wherein the container includes a contiguous first portion and second portion that provides access for maintenance without the need to remove the plant.

SUMMARY OF THE INVENTION

It is the object of the present invention to provide a hydroponic container configured to be utilized for the hydroponic growing of plants wherein the hydroponic container includes a first portion and a second portion.

Another object of the present invention is to provide a hydroponic plant container operable to provide an environment for the hydroponic growing of plants wherein the first portion of the hydroponic container of the present invention includes an interior volume.

A further object of the present invention is to provide a hydroponic container configured to be utilized for the hydroponic growing of plants wherein the second portion of the hydroponic container includes an interior volume.

Still another object of the present invention is to provide a hydroponic plant container operable to provide an environment for the hydroponic growing of plants wherein the interior volume of the first portion and second portion of the hydroponic container are fluidly coupled.

An additional object of the present invention is to provide a hydroponic container configured to be utilized for the hydroponic growing of plants wherein the first portion includes at least one outer wall forming the shape thereof.

Yet a further object of the present invention is to provide a hydroponic plant container operable to provide an environment for the hydroponic growing of plants wherein the second portion includes at least one outer wall forming the shape thereof and is contiguous with the at least one outer wall of the first portion.

Another object of the present invention is to a provide a hydroponic container configured to be utilized for the hydroponic growing of plants wherein the second portion of the container includes an opening so as to provide access to the interior volume thereof.

An alternate object of the present invention is to provide a hydroponic plant container operable to provide an environment for the hydroponic growing of plants wherein portions of the interior volume of the first portion are accessible via the interior volume of the second portion.

Still a further object of the present invention is to provide a hydroponic container configured to be utilized for the hydroponic growing of plants wherein the first portion is formed in a first preferred shape and a second prefer shape.

An additional object of the present invention is to provide a hydroponic plant container operable to provide an environment for the hydroponic growing of plants wherein the first portion of the hydroponic container includes an upper edge wherein the upper edge includes a lip member formed thereon.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
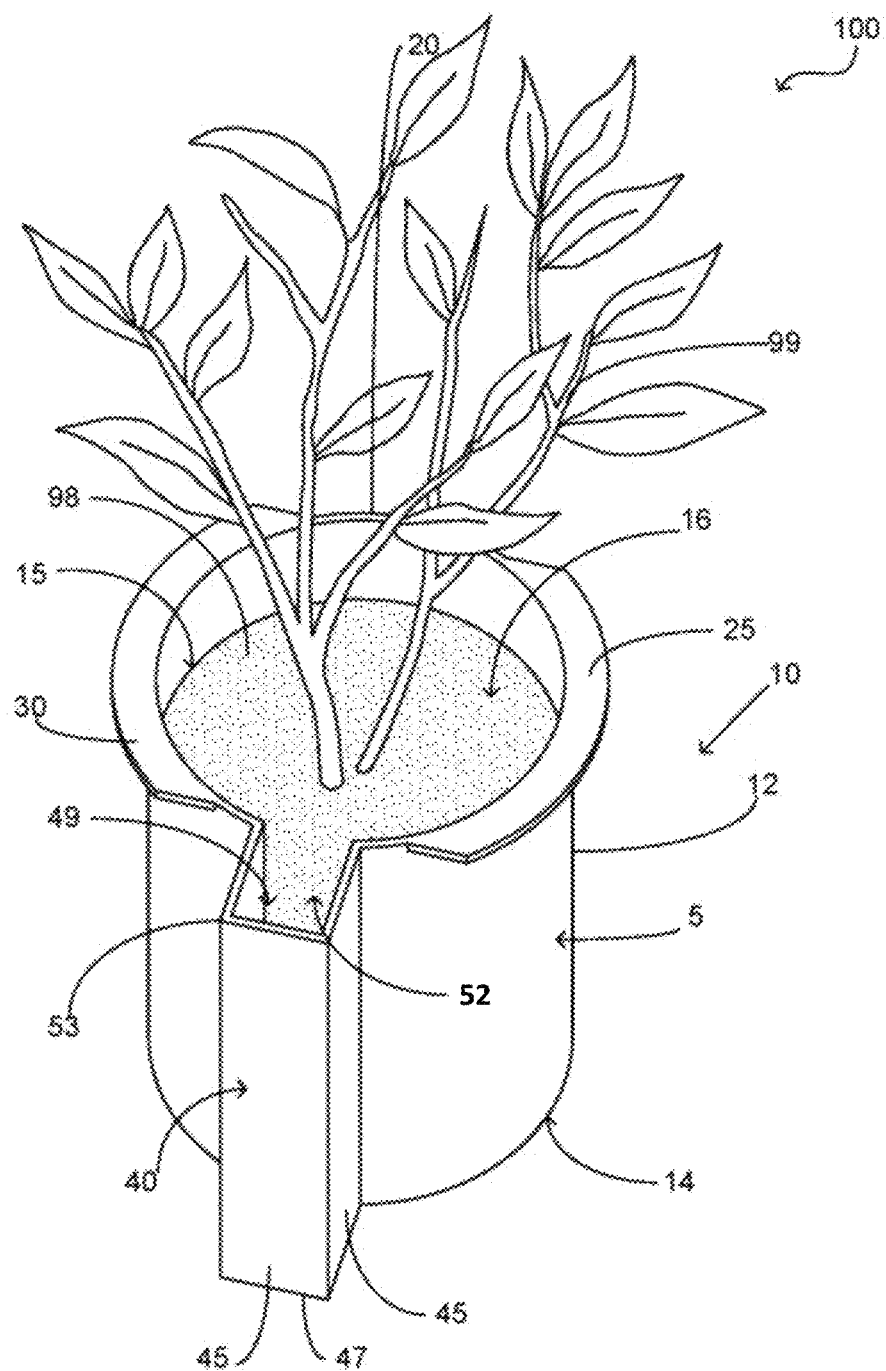
FIG. 1 is a perspective view of a preferred embodiment of the present invention.

Referring now to the drawings submitted herewith, wherein various elements depicted therein are not necessarily drawn to scale and wherein through the views and figures like elements are referenced with identical reference numerals, there is illustrated a hydroponic plant container 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Figure 2:
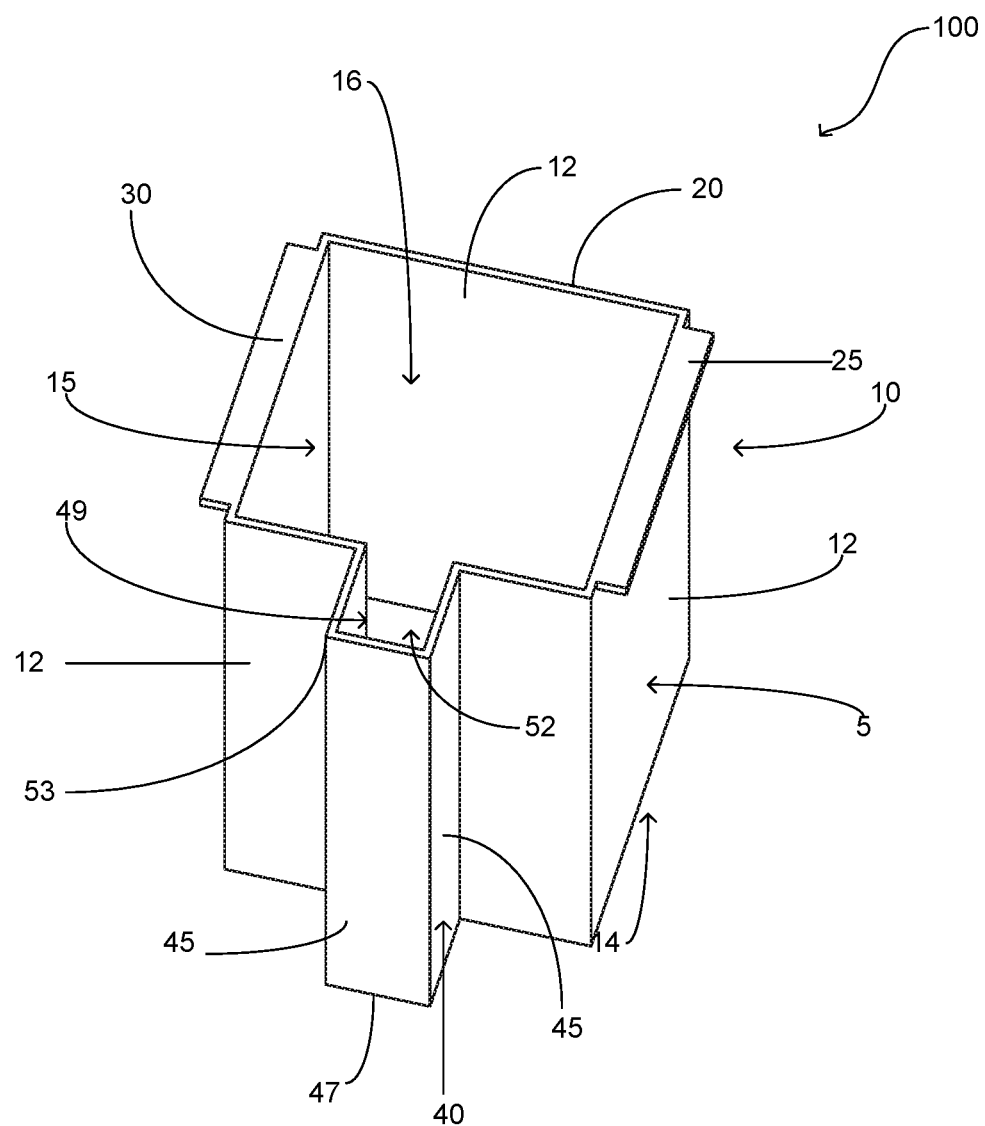
FIG. 2 is a perspective view of an alternate preferred embodiment of the present invention.

Now referring in particular to the Figures submitted herewith, hydroponic plant container 100 includes a body 10 that includes a first portion 5 having a wall 12 integrally formed with a bottom 14 having an opening 15 providing access to the interior volume 16 of the first portion 5 of the body 10. The wall 12 and bottom 14 are integrally formed utilizing suitable durable methods. The first portion 5 has an interior volume 16 that is of suitable size to accommodate an exemplary plant 99. Those skilled in the art will understand that the exemplary plant 99 is disposed in a basket or similar article wherein the basket is operable to contain the root ball of the exemplary plant 99 and provide exposure to the water 98 that has been deposited into the interior volume 16 of the body 10. As illustrated herein in FIG. 2, it is contemplated within the scope of the present invention that the body 10 could have more than one wall 12 so as to form an alternate shape thereof. It is contemplated within the scope of the present invention that the body 10 could be formed in alternate shapes but that a preferred embodiment of the body 10 is an annular shape and a square shape.

The hydroponic plant container 100 is manufactured from a durable rigid material such as but not limited to plastic. The body 10 of the hydroponic plant container 100 is manufactured in alternate sizes so as to accommodate various species of plants therein. The body 10 includes upper perimeter edge 20. The upper perimeter edge 20 defines the boundary of the opening 15 providing access to the interior volume 16. The upper perimeter edge 20 has integrally formed therewith a first lip member 25 and a second lip member 30. The first lip member 25 and the second lip member 30 are located on opposing sides of the body 10. The first lip member 25 and second lip member 30 are perpendicular to the upper perimeter edge 20 and extend outward therefrom. The first lip member 25 and second lip member 30 are provided to enable grasping of the body 10 or to provide an element wherein the body 10 can be suspendedly mounted within another container. While the body 10 is illustrated as having a first lip member 25 and a second lip member 30 on opposing sides thereof, it is contemplated within the scope of the present invention that the body 10 could have a lip member disposed substantially around the upper perimeter edge 20.

The body 10 includes a second portion 40 contiguously formed with the first portion 5. The second portion 40 includes walls 45 defining the shape thereof along with a bottom 47 that is integrally formed with the bottom 14 of the first portion 5. The walls 45 and bottom 47 define an interior volume 49 of the second portion 40. The interior volume 49 is fluidly coupled with the interior volume 16 of the first portion 5 of the body 10. The second portion 40 is manufactured of suitable size so as to provide access to the interior volume 16 of the first portion 5. The second portion 40 includes opening 52 defined by perimeter edge 53. The opening 52 provides access to the interior volume 49 of the second portion 40.

Providing access to the interior volume 49 of the second portion 40 allows for a user of the hydroponic plant container 100 to access items such as but not limited to air stones, circulation lines and pumps without the need to lift the exemplary plant 99 out of the water 98. Furthermore, the second portion 40 is of suitable size and integrally formed with the first portion 5 of the body 10 so as to facilitate addition of water and checking the level thereof without the requirement of moving the exemplary plant 99. Additionally, construction of the body 10 having the first portion 5 and second portion 40 integrally formed provides a user of the hydroponic plant container 100 the ability to view the conditions of the roots of the exemplary plant 99 without the need to lift the exemplary plant 99 from the interior volume 16 of the first portion 5.

Figure 3:
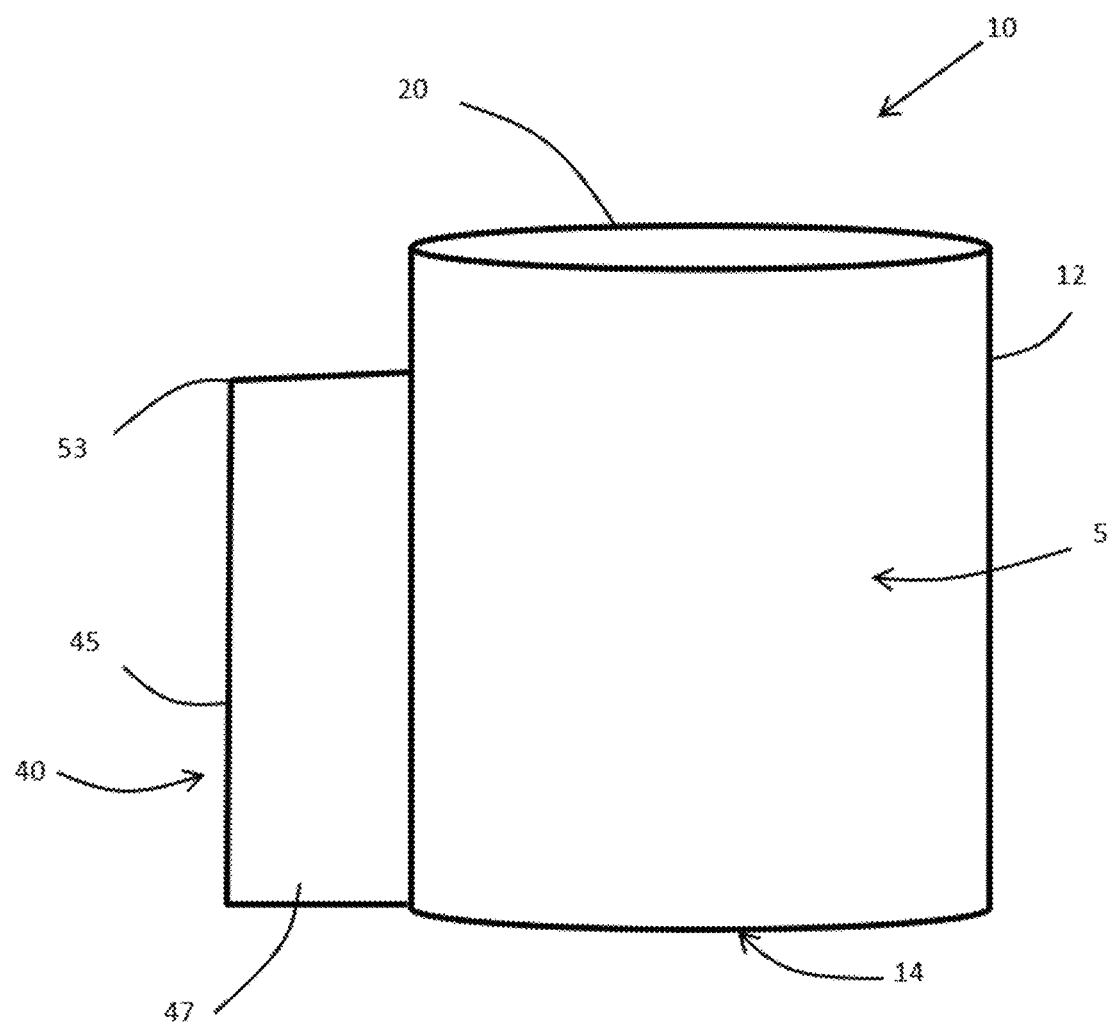
FIG. 3 is a side view of an alternate preferred embodiment of the present invention.

While the perimeter edge 53 of the second portion 40 of the body 10 of the hydroponic plant container 100 is illustrated herein as being level with the upper perimeter edge 20 of the first portion 5, it is contemplated within the scope of the present invention that the perimeter edge 53 could be at a different height than the upper perimeter edge 20 as shown in FIG. 3. By way of example but not limitation, the perimeter edge 53 could be at a lower height than the upper perimeter edge 20. The second portion 40 provides vertical access to the interior volume 16 of the first portion 5 of the body 10. While no particular size of the hydroponic plant container 100 is required, good results have been achieved having a hydroponic plant container 100 wherein the body 10 is approximately five gallons in size.

While no particular size is required for the opening 52 of the second portion 40, good results have been achieved utilizing an opening 52 being approximately four square inches in size.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding description is, therefore, not intended to be limited to the specific forms set forth herein, but on the contrary, it is intended to cover such alternatives, modifications, and equivalents, as can be reasonably included within the spirit and scope of the invention.

What is claimed is:

1. A hydroponic plant container comprising:
a body, said body having a plurality of walls and a bottom forming an interior volume, said body consisting of a first portion that defines an annular or quadrilateral cross-sectional shape and a singular projection extending outwardly from the first portion comprising a second portion, said first portion and said second portion each being defined by at least one of the plurality of walls, said first portion defining a first interior volume, said second portion defining a second interior volume, wherein said second interior volume of said second portion is fluidly coupled to said first interior volume of said first portion,
wherein the first portion of the body includes a first upper opening providing access to the first interior volume thereof, and the second portion of the body includes a second upper opening providing access to the second interior volume thereof,
wherein said first portion has a first upper perimeter edge defining at least a portion of the first upper opening, and said second portion has a second upper perimeter edge defining the second upper opening,
wherein said second portion of said body is offset from the first portion and defined by opposing first and second walls extending from the at least one wall of the first portion, and a third wall connected to and extending directly between the first and second opposing walls, the third wall defining an exterior side of the body,
wherein a total cross-sectional area of the second portion at the second upper opening is less than a cross-sectional area of the first portion at the first upper opening, and
wherein said second upper perimeter edge is defined by the first, second and third walls and is at a lower height than said first upper perimeter edge to provide access to the first interior volume of said first portion via the second upper opening of said second portion.

2. The hydroponic plant container as recited in claim 1, wherein said first upper perimeter edge defines the opening for said first portion.

3. The hydroponic plant container as recited in claim 2, wherein the first upper perimeter edge further includes lip members, said lip members contiguously formed with said upper perimeter edge, said lip members extending outward from said upper perimeter edge and being perpendicular thereto.

4. The hydroponic plant container as recited in claim 3, wherein said lip members are on opposing sides of the body.

5. The hydroponic plant container as recited in claim 1, wherein the body has a capacity of approximately five gallons.

6. The hydroponic plant container as recited in claim 1, wherein the second portion is square in shape.

7. A hydroponic plant container configured to provide access to a portion of the interior volume thereof so as to avoid engagement of a plant disposed therein comprising:
a body, said body having a plurality of walls and a bottom forming an interior volume, said body consisting of a first portion that defines an annular or quadrilateral cross-sectional shape and a singular projection extending outwardly from the first portion comprising a second portion, said first portion and said second portion of said body being contiguous, said first portion having at least one wall forming a first interior volume, said second portion having a plurality of walls forming a second interior volume, said first interior volume of said first portion being fluidly coupled with said second interior volume of said second portion, said first portion having a first upper perimeter edge defined at least in part by the at least one wall thereof and said second portion having a second upper perimeter edge by the plurality of walls thereof, wherein said second upper perimeter edge is at a lower height than said first upper perimeter edge,
wherein the first portion of the body includes a first opening providing access to the first interior volume thereof defined at least in part by the first upper perimeter edge, and the second portion of the body includes a second opening providing access to the second interior volume thereof defined at least in part by the second upper perimeter edge,
wherein said second portion of said body is offset to said first portion and defines an end of the body to provide access to the first interior volume of said first portion via the second opening,
wherein said plurality of walls of said second portion comprise opposing first and second walls extending from the at least one wall of the first portion, and a third wall connected to and extending directly between the first and second opposing walls that defines an outermost end of the container, and
wherein the second interior volume is less than the first interior volume.

8. The hydroponic plant container as recited in claim 7, wherein said first upper perimeter edge further includes a first lip member, said first lip member being contiguous with said first upper perimeter edge, said first lip member extending outward from said first upper perimeter edge and being perpendicular thereto.

9. The hydroponic plant container as recited in claim 8, wherein said first upper perimeter edge further includes a second lip member, said second lip member being contiguous with said first upper perimeter edge, said second lip member extending outward from said first upper perimeter edge and being perpendicular thereto, said second lip member being oppositely located on said body from said first lip member.

10. The hydroponic plant container as recited in claim 7, wherein the second portion is square in shape.

11. The hydroponic plant container as recited in claim 7, wherein the first portion is square in shape.

12. The hydroponic plant container as recited in claim 1, wherein the third wall an outermost end of the container.

13. The hydroponic plant container as recited in claim 1, wherein the second interior volume is less than the first interior volume.

14. The hydroponic plant container as recited in claim 1, wherein the second interior volume of the second portion is in direct communication with said first interior volume of said first portion from the bottom of the body to the second upper opening.

15. The hydroponic plant container as recited in claim 7, wherein the third wall defines an exterior side of the body.

16. The hydroponic plant container as recited in claim 7, wherein a total cross-sectional area of the second portion at the second upper opening is less than a cross-sectional area of the first portion at the first upper opening.

17. A method of hydroponically growing a plant, comprising:
  providing a hydroponic plant container that comprises a body having a plurality of walls and a bottom forming an interior volume, said body consisting of a first portion configured to contain water and a root ball of a plant that defines an annular or quadrilateral cross-sectional shape and a singular projection extending outwardly from the first portion comprising a second portion configured to provide access to water and a root ball of a plant contained within the first portion, said first portion and said second portion each being defined by at least one of the plurality of walls, said first portion defining a first interior volume, said second portion defining a second interior volume, wherein said second interior volume of said second portion is fluidly coupled to said first interior volume of said first portion,
  wherein the first portion of the body includes a first upper opening providing access to the first interior volume thereof, and the second portion of the body includes a second upper opening providing access to the second interior volume thereof,
  wherein said first portion has a first upper perimeter edge defining at least a portion of the first upper opening, and said second portion has a second upper perimeter edge defining the second upper opening,
  wherein said second portion of said body is offset from the first portion and defined by opposing first and second walls extending from the at least one wall of the first portion, and a third wall connected to and extending directly between the first and second opposing walls, the third wall defining an exterior side of the body,
  wherein a total cross-sectional area of the second portion at the second upper opening is less than a cross-sectional area of the first portion at the first upper opening,
  wherein said second upper perimeter edge is defined by the first, second and third walls and is at a lower height than said first upper perimeter edge to provide access to the first interior volume of said first portion via the second upper opening of said second portion.

18. The method as recited in claim 17, wherein the second interior volume of the second portion is in direct communication with said first interior volume of said first portion from the bottom of the body to the second upper opening.

19. The method as recited in claim 17, further comprising positioning water and a root ball of a plant in the first interior volume of the first portion, and accessing the water and the root ball of the plant via the second interior volume of the second portion without removing the root ball of the plant from the first interior volume.

20. The method as recited in claim 19, wherein the accessing comprises at least one of:
  adding additional water to the first interior volume of the first portion via the second interior volume of the second portion by introducing the water into the second interior volume; and
  visually inspecting the root ball of the plant via the second interior volume of the second portion.

\* \* \* \* \*